United States Patent
Magnusson et al.

(10) Patent No.: US 12,311,952 B2
(45) Date of Patent: *May 27, 2025

(54) METHODS, APPARATUSES, SYSTEMS AND COMPUTER PROGRAM PRODUCTS FOR ESTIMATING ROAD SURFACE TEMPERATURE

(71) Applicant: NIRA Dynamics AB, Linköping (SE)

(72) Inventors: Per Olof Magnus Magnusson, Linköping (SE); Lars William Jonsson, Linköping (SE); Lisa Ingegerd Eriksson, Linköping (SE)

(73) Assignee: NIRA Dynamics AB, Linköping (SE)

( * ) Notice: Subject to any disclaimer, the term of this patent is extended or adjusted under 35 U.S.C. 154(b) by 104 days.

This patent is subject to a terminal disclaimer.

(21) Appl. No.: 17/785,381

(22) PCT Filed: Dec. 22, 2020

(86) PCT No.: PCT/EP2020/087630
§ 371 (c)(1),
(2) Date: Jun. 14, 2022

(87) PCT Pub. No.: WO2021/130227
PCT Pub. Date: Jul. 1, 2021

(65) Prior Publication Data
US 2023/0032819 A1 Feb. 2, 2023

(30) Foreign Application Priority Data
Dec. 23, 2019 (DE) .......................... 102019135751.9

(51) Int. Cl.
*B60W 40/06* (2012.01)
*G01W 1/02* (2006.01)
(Continued)

(52) U.S. Cl.
CPC .............. *B60W 40/06* (2013.01); *G01W 1/02* (2013.01); *G06N 3/08* (2013.01);
(Continued)

(58) Field of Classification Search
CPC ..... G01W 1/02; G01W 1/10; G01W 2203/00; B60W 40/06; B60W 2555/20
See application file for complete search history.

(56) References Cited

U.S. PATENT DOCUMENTS 6,173,231 B1 * 1/2001 Chojnacki ................ B60Q 9/00
340/901
2014/0307247 A1 * 10/2014 Zhu ...................... B60W 40/064
342/54
(Continued)

FOREIGN PATENT DOCUMENTS

DE 102017214053 A1 2/2019
DE 102018008788 A1 5/2019
(Continued)

OTHER PUBLICATIONS

European Patent Office, PCT International Search Report and Written Opinion, Application No. PCT/EP2020/087630, dated Apr. 29, 2021, 16 pages.
(Continued)

*Primary Examiner* — Mirza F Alam
(74) *Attorney, Agent, or Firm* — Mahamedi IP Law LLP

(57) ABSTRACT

Methods, apparatuses, systems and computer program products are disclosed to estimate road surface temperature for a geographic location. Reference ambient sensor data indicative of ambient conditions in vicinity to mobile vehicles are retrieved. Reference roadside sensor data indicative of at least road surface temperature in vicinity to distributed roadside sensors are retrieved. A relationship is established between the reference ambient sensor data and road surface
(Continued)

temperature, based on the reference ambient sensor data and based on the reference roadside sensor data. A data structure is created, encoding the established relationship. Further, current vehicle ambient sensor data, indicative of current ambient conditions in vicinity to the one or more vehicles, are collected at one or more vehicles. Finally, a road surface temperature estimate is determined for the geographic location, using the data structure and using the collected current vehicle ambient sensor data.

13 Claims, 5 Drawing Sheets

(51) Int. Cl.
    *G06N 3/08*           (2023.01)
    *G08G 1/0967*    (2006.01)

(52) U.S. Cl.
    CPC ... *G08G 1/096766* (2013.01); *B60W 2555/20* (2020.02); *B60W 2556/45* (2020.02); *G01W 2203/00* (2013.01)

(56) References Cited

U.S. PATENT DOCUMENTS

| | | | |
|---|---|---|---|
| 2015/0166072 A1 | 6/2015 | Powers et al. | |
| 2017/0176196 A1* | 6/2017 | Powers | G01C 21/3602 |
| 2017/0357669 A1 | 12/2017 | Offenhaeuser et al. | |
| 2018/0194286 A1 | 7/2018 | Stein | |
| 2019/0001988 A1 | 1/2019 | Ienaga et al. | |
| 2019/0047575 A1 | 2/2019 | Lellmann et al. | |
| 2020/0271550 A1 | 8/2020 | Svantesson | |
| 2021/0048529 A1* | 2/2021 | Roy Chowdhury | G06V 20/56 |
| 2022/0073042 A1 | 3/2022 | Myklebust et al. | |
| 2023/0032819 A1 | 2/2023 | Magnusson et al. | |
| 2023/0245509 A1* | 8/2023 | Armstrong | G01C 21/3822 701/41 |

FOREIGN PATENT DOCUMENTS

| | | |
|---|---|---|
| DE | 102018202933 A1 | 8/2019 |
| DE | 102018203807 A1 | 9/2019 |
| JP | 2002-048878 A | 2/2002 |
| JP | 2007-017197 A | 1/2007 |

OTHER PUBLICATIONS

German Patent and Trademark Office, Office Action, DE Application No. 102019135751.9, mailed Oct. 16, 2020, 5 pages.

European Patent Office, PCT International Search Report and Written Opinion, Application No. PCT/EP2020/083676, dated Feb. 4, 2021, 13 pages.

\* cited by examiner

ମETHODS, APPARATUSES, SYSTEMS AND
COMPUTER PROGRAM PRODUCTS FOR
ESTIMATING ROAD SURFACE
TEMPERATURE

TECHNICAL FIELD

The present invention generally relates to estimating road surface temperature for a geographic location.

BACKGROUND OF THE INVENTION

In modern vehicles, a wide variety of sensors are available, which directly or indirectly yield information about current conditions of the car and its ambient surroundings in order to, for instance, adapt vehicle behavior accordingly. One parameter of interest is the current temperature of the road surface, as this may have influence on tire-road interaction (e.g. friction) and thereby influence vehicle behavior, e.g. during an ABS braking.

However, standard vehicles typically do not have sensors which allow to directly measure road surface temperature. In order to estimate the surface temperature of a road segment at a given geographic location, conventional approaches have relied on roadside weather stations, such as the Road Weather Information System (RWIS), which uses a plurality of environmental sensor stations distributed along roads to perform measurements and which reports these measurements to a central server for interpretation (e.g. using a model) and dissemination (e.g. to vehicles).

As a result, these conventional approaches rely on the presence and availability of data from roadside weather stations and the estimation accuracy is correlated to the geographic density of road weather stations. To achieve a high accuracy, a high density of road weather stations are required. However, these data may not be available for a number of reasons, such as: remote roads may not be equipped with RWIS stations; RWIS stations may be temporarily unavailable for technical, economical or environmental reasons; a provider of RWIS data may make the data available only to a limited group of subscribers; the data is representative only for a limited geographical region, or a variety of other reasons.

For a worldwide coverage, a user of the RWIS data may need to obtain such data from a plurality of local providers and the user may need a plurality of different models describing the dependencies for each geographical location.

As can be seen from these examples, a common problem in estimation of road surface temperature is the reliance on the availability of roadside weather stations. Therefore, it is of great interest to provide alternative ways to estimate road surface temperature.

Therefore, it is an object of the present invention to provide enhanced solutions for an estimation of road surface temperature for a geographic location.

SUMMARY OF THE INVENTION

Methods, apparatuses, systems and computer program products are disclosed, to overcome at least partially the shortcomings of the type mentioned above and others.

In a first aspect, a method of estimating road surface temperature for a geographic location is disclosed.

The method comprises retrieving reference ambient sensor data and retrieving reference roadside sensor data. The ambient sensor data is indicative of ambient conditions in vicinity to mobile vehicles and the reference roadside sensor data is indicative of at least road surface temperature in vicinity to distributed roadside sensors. In particular, the retrieving may be carried out in a data warehouse.

Data indicative of ambient conditions are of a type to be collectable at least using vehicles sensors. Non-limiting examples of ambient conditions may include one or more of the following: Ambient air temperature, sun radiation, GPS location, time, date, humidity, air pressure, wind speed, rain intensity, vehicle speed, fog, surface water amount, snow amount, ice presence, traffic intensity (e.g. vehicles per time), wind direction, salt amount, surface type (such as asphalt, concrete, gravel etc.), estimated friction coefficient. Preferably, a plurality of the above-mentioned ambient conditions is used. The use of multiple ambient conditions increases the basis of data on which a relationship is to be built and thereby increases the reliability and accuracy of the road surface temperature estimation using such comprehensive information.

Examples of distributed roadside sensors may include the above-mentioned roadside weather stations (RWIS). Other examples include advanced vehicle-mounted sensors, which are distributed across the road network dynamically by virtue of the vehicles equipped therewith and which may be configured to provide data indicative of road surface temperature for some distributed reference vehicles.

The method further comprises establishing a relationship between the reference ambient sensor data and road surface temperature, based on the reference ambient sensor data and based on the reference roadside sensor data, and creating a data structure encoding the established relationship. Examples of establishing a relationship may include training a neural network or applying a filtering method, as will be detailed below. Such relationships and corresponding data structures may thus allow to lay down the dependency of road surface temperature on one or more measurable input variables.

For instance, a neural network may be trained on the reference ambient sensor data and on the reference roadside sensor data (including road surface temperature) such that the trained neural network may take (current) vehicle ambient sensor data as input to provide road surface temperature as output. Such neural network thus encodes the dependency of road surface temperature on ambient sensor data.

The method further comprises collecting, at one or more vehicles, current vehicle ambient sensor data indicative of current ambient conditions in vicinity to the one or more vehicles. Similarly to the ambient conditions mentioned above with reference to the reference ambient senor data, non-limiting examples of current ambient conditions may include one or more of the following: Ambient air temperature, sun radiation, GPS location, time, date, humidity, air pressure, wind speed, rain intensity, vehicle speed, fog, surface water amount, snow amount, ice presence, traffic intensity (e.g. vehicles per time), wind direction, salt amount, surface type (such as asphalt, concrete, gravel etc.), estimated friction coefficient.

Preferably, the current vehicle ambient sensor data may be of the same type as the reference ambient sensor data. For instance, both data may be indicative of ambient air temperature, irrespective of the particular sensor used for collecting this type of data. This allows to feed the relationship established using (reference) ambient sensor data with the same type of data, namely (current vehicle) ambient sensor data.

Further, the method comprises determining, using the data structure and using the collected current vehicle ambient sensor data, a road surface temperature estimate for the geographic location. In particular, the collected current vehicle ambient sensor data may be used as an input to the data structure. The relationship encoded by the data structure thus allows to obtain as an output a road surface temperature estimate for the geographic location.

As a result, the determining of the road surface temperature estimate may exclude the use of current roadside sensor data (once the relationship has been established), which allows to estimate surface temperature even in the absence or unavailability of distributed roadside stations for the geographic location at which the surface temperature is to be estimated.

In some embodiments, the method further comprises transmitting the collected current vehicle ambient sensor data from the one or more vehicles to the data warehouse. This allows to centralize the determining of the road surface temperature estimate and thereby reduce processing needs at the vehicles as well as increase the amount of current vehicle ambient sensor data, namely by using such data from a plurality of vehicles.

This may further allow to collect ambient data for one geographic location from a plurality of vehicles, in particular throughout an extended period of time in order to build a time series of current vehicle ambient sensor data for one geographic location. For the purpose of the present disclosure, the term "time series" refers to a set of data points, which is indicative of the measurable values (e.g. of ambient conditions, such as ambient air temperature) for a plurality of points in time, irrespective of whether all measurements are performed by a same sensor or by multiple sensors, and irrespective of whether the plurality of points in time are continuous or discrete or any combination thereof.

In particular, a time series may be measured in entirety or it may be measured partly and then completed by way of interpolation or extrapolation. An exemplary duration of time series may be in the range of one day to several months, more preferably 3 days to 30 days, such as a duration of (approx.) 10 days. For instance, such durations may be suited to capture freezing and melting behavior in the ground.

In some embodiments, the method further comprises generating road condition data based on the determined road surface temperature estimate and transmitting the generated road condition data to at least one of the vehicles and/or to other vehicles. This allows to apply the estimated surface temperature in a connected-driving environment, e.g. by performing the estimation of the road surface temperature remotely to the vehicles and by transmitted information about road conditions to the vehicle(s). The vehicle(s) may use these road condition data to control vehicle behavior, e.g. to take into account how the road conditions would affect a potential ABS braking.

In some embodiments the retrieved reference ambient sensor data may comprise a (first) time series indicative of ambient conditions for a (first) plurality of points in time. This allows to establish the relationship based on a more comprehensive basis of data, in particular showing the temporal evolution of ambient conditions. The inventors have recognized that such temporal evolution encodes valuable information about the micro-climate typical for geographic locations, which show such temporal evolution. For instance, presence of a nearby lake not only affects ambient conditions (such as the moist in the air, represented by measurements of humidity), but may also affect the speed of heating/cooling of the road surface temperature. Such dependency may be encoded in the relationship, e.g. by training a neural network with time series of reference ambient sensor data. The use of time series thus allows to capture physical dynamics (such as ground freezing) and thereby implicitly contains information about meteorological specifics.

Additionally, or alternatively, the collected current vehicle ambient sensor data may comprise a (second) time series indicative of current ambient conditions for a (second) plurality of points in time. This allows to determine the road surface temperature estimate based on a more comprehensive basis of data, in particular showing the temporal evolution of ambient conditions. Similarly to the establishing of the relationship, such temporal evolution encodes valuable information about the micro-climate for the particular geographic location in question.

Preferably, both the establishing of the relationship and the determining of the road surface temperature estimate may be based on such time series.

In some embodiments, the relationship may be established by training a neural network and the data structure is representative of the neural network. Alternatively, it may be established by applying a filtering method, in particular a Kalman filter or a Bayesian filter or a non-statistical filter, and wherein the data structure is representative of the output of the filter. This allows to establish the dependency of road surface temperature with a minimum of hypothesis or knowledge about the dependency (contrary to a regression analysis, for instance, which requires an assumption about a parametric function describing such dependency).

In some embodiments, one or more of the reference ambient sensor data, the reference roadside sensor data, and the current vehicle ambient sensor data is location-specific. For instance, knowledge about the location for the reference ambient sensor data and reference roadside sensor data facilitates to establish a link between these two sets of data. Similarly, knowledge about the location for the current vehicle ambient sensor data allows to use this additional information as further input to the relationship in determining a road surface temperature estimate.

In some embodiments, the reference roadside sensor data may, in addition to road surface temperature, further be indicative of one or more of the following ambient conditions: Ambient air temperature, ground temperature at one or more depths; sun radiation, humidity, wind speed, GPS location, time, date, air pressure, rain intensity, fog, surface water amount, snow amount, ice presence, traffic intensity (e.g. vehicles per time), wind direction, salt amount, surface type (such as asphalt, concrete, gravel etc.), estimated friction coefficient. It may be collected by one or more of a variety of means, such as dedicated sensors, cameras, weather stations, visual inspection, lidar, radar, or a fusion of data from multiple sources. This allows to take into account any discrepancies between the values of these ambient conditions indicated by the reference roadside sensor data as compared to the values of these ambient conditions indicated by the reference ambient sensor data.

In some embodiments, the method may further comprise retrieving, in the data warehouse, reference weather data indicative of general weather conditions, and receiving current weather data indicative of current general weather conditions for the geographic location. In such cases the establishing of the relationship may further be based on the reference weather data. This allows to establish a more comprehensive relationship between the road surface temperature and input data. For instance, weather data (which is typically readily and globally available, without significant restrictions, contrary to roadside data) may be used as a further input parameter, used both during establishing of the relationship (e.g. training of a neural network) and during determining of a road surface temperature estimate. In particular, in such cases, the determining of the road surface temperature estimate may further be based on the current weather data.

Non-limiting examples of the reference weather data or current weather data include one or more of the following: Ambient air temperature, sun inclination, cloudiness, geographic area, humidity, wind speed, time, date, air pressure, rain intensity, fog, surface water amount, snow amount, ice presence, temperature profile at different heights, wind direction, surface temperature.

In a second aspect, a computer program product is disclosed. The computer program product includes program code configured to, when executed in a computing device, to carry out the steps of a method according to the first aspect.

In a third aspect, an apparatus for estimating road surface temperature for a geographical location is disclosed. The apparatus comprises a data storage unit, a communication interface and a processing unit. The data storage unit is configured to store a data structure encoding a relationship between reference ambient sensor data, measurable by vehicles, and road surface temperature. The communication interface is for receiving current vehicle ambient sensor data indicative of current ambient conditions in vicinity to the vehicle.

The processing unit is communicatively coupled with the vehicle sensor and the data storage unit and it is configured to determine, using the data structure, a road surface temperature estimate for the geographical location based on the collected current vehicle ambient sensor data.

Such apparatus thus allows to take full advantage of the relationship encoded in the data structure, irrespective of whether the relationship has been established by the apparatus or by another entity (and received by the apparatus).

In a fourth aspect, a data warehouse unit for producing a data structure is disclosed, which is configured to (i) obtain reference ambient sensor data indicative of ambient conditions in vicinity to vehicles, (ii) obtain reference roadside sensor data indicative of at least road surface temperature in vicinity to and measured by roadside sensors, (iii) establish a relationship between the reference ambient sensor data and road surface temperature, based on the reference ambient sensor data and based on the reference roadside sensor data, (iv) create a data structure encoding the established relationship; and (v) transmit the data structure to the apparatus. Such data warehouse unit allows to produce a data structure encoding a relationship for a wide variety of users or user equipment. For instance, the data structure may be transmitted to an apparatus according to the third aspect or any other apparatus configured to use the relationship encoded in the data structure.

In a fifth aspect, a system for estimating road surface temperature for a geographic location is disclosed. The system comprises an apparatus according to the third aspect and a data warehouse unit according to the fourth aspect. The data warehouse unit is coupled communicatively to the apparatus to transmit the data structure of the data warehouse unit to the apparatus. Such system allows to take full advantage of all of the aspects mentioned above, as it includes both the data warehouse unit and the apparatus.

In some embodiments, the system may further comprise a vehicle sensor, configured to collect current vehicle ambient sensor data indicative of current ambient conditions in vicinity to the vehicle, and communicatively coupled to the communication interface of the apparatus.

In a sixth aspect, use of a system according to the fifth aspect is disclosed, for estimating a road surface temperature.

SHORT DESCRIPTION OF THE DRAWINGS

The following detailed description refers to the appended drawings, wherein:

FIG. 1 schematically illustrates a situation with roads and vehicles, in which situation methods, data warehouse units or systems according to embodiments may be used;

DETAILED DESCRIPTION OF EMBODIMENTS

Figure 1:
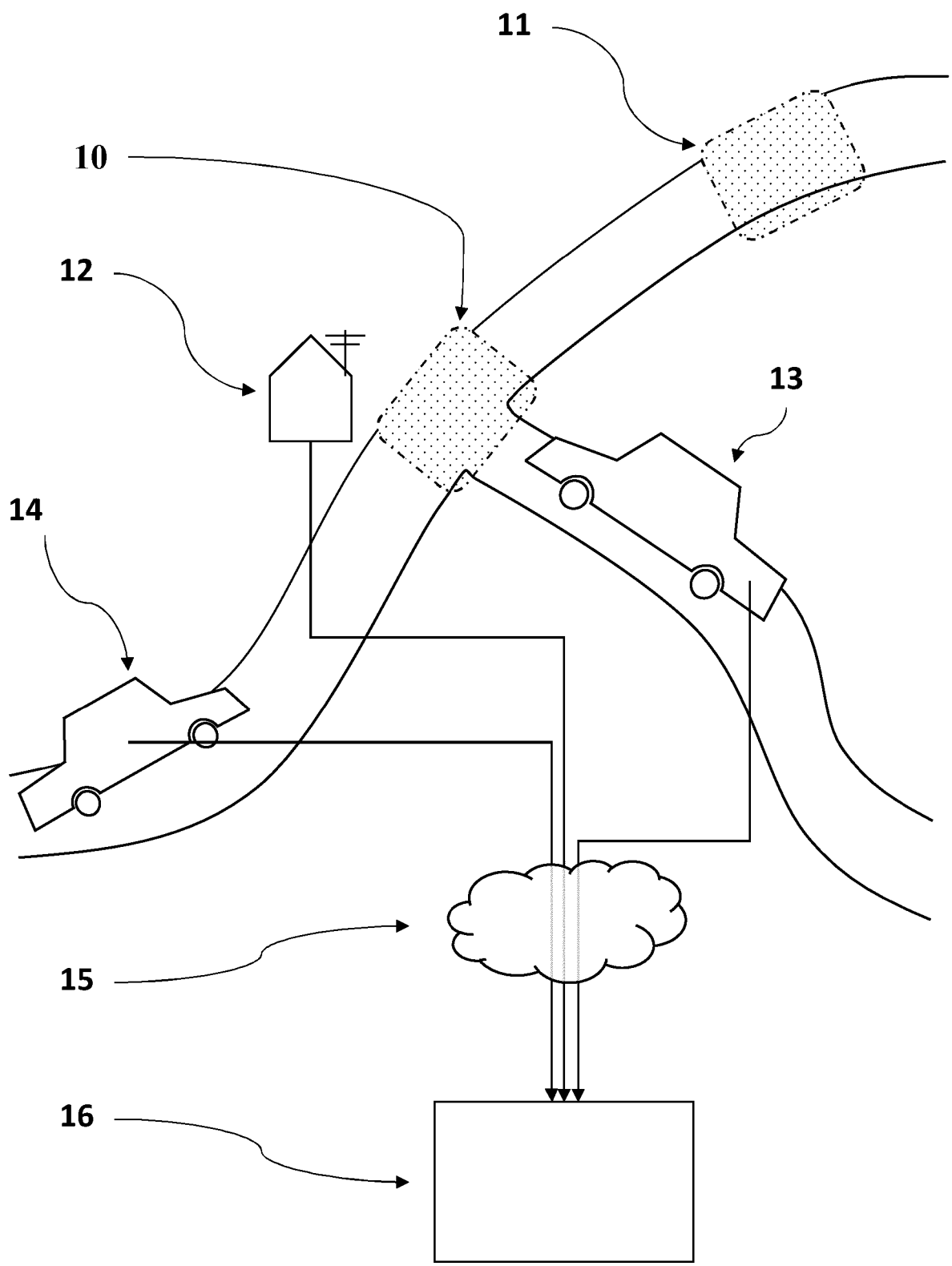

FIG. 1 schematically illustrates a situation with roads and vehicles, in which situation methods, data warehouse units or systems according to the present disclosure may be used.

In particular, FIG. 1 shows a first geographic location 10. In the example shown, first geographic location 10 is a road segment. The present disclosure applies to geographic location of essentially any level of granularity. For instance, a geographic location may be a state, a region, a municipality, a road, a road segment, a unit area of a grid, a cross-roads, etc. Preferably, the geographic location is a road segment.

The road segment 10 is provided with a stationary roadside sensor 12, which is configured to measure reference roadside sensor data indicative of at least road surface temperature at road segment 10.

Although the example shown in FIG. 1 is a stationary measurement station, the function of the stationary roadside sensors may additionally or alternatively be performed by other distributed roadside sensors, such as sensors of a mobile reference station, e.g. a specially equipped reference vehicle.

In any case, the reference roadside sensor data is transmitted from stationary roadside sensor 12 to a data warehouse unit 16 for further processing.

FIG. 1 further shows another road segment 11, which is not provided with any sensor capable of measuring road surface temperature.

Two vehicles 13, 14 are approaching road segment 10. Both vehicles 13, 14 are equipped with respective reference ambient sensors, configured to collect reference ambient sensor data, such as an ambient air temperature sensor (not shown).

Vehicle 13 may reach road segment 10 earlier than vehicle 14 will. Once vehicle 13 is in vicinity of road segment 10, at a first point in time, it will collect reference ambient sensor data, such as a first ambient air temperature. The reference ambient sensor data collected by the first vehicle 13 is transmitted by vehicle 13 to the data warehouse unit 16, e.g. together with additional information such as location and/or time/date.

Similarly, once vehicle 14 is in vicinity of road segment 10, at a second point in time, it will collect reference ambient sensor data, such as a second ambient air temperature. The reference ambient sensor data collected by second vehicle 14 is transmitted by vehicle 14 to the data warehouse unit 16, e.g. together with additional information such as location and/or time/date.

In other embodiments, not shown, the collection of reference ambient sensor data may additionally or alternatively be carried out by roadside sensor 12. This allows to collect the two sets of data for the establishing of a relationship (i.e. reference ambient sensor data and reference roadside sensor data) from a same location (namely where sensor 12 is located) and thereby increases the accuracy of the relationship to be established.

Returning to the description of FIG. 1, the transmission to data warehouse unit 16 may occur wirelessly, for instance via internet 15.

At data warehouse unit 16, the data collected by roadside sensor 12 and vehicles 13, 14 is further processed in order to establish a relationship therebetween and creating a data structure encoding this relationship, as will be detailed in the following.

As will be apparent from the following description, the teaching according to the present disclosure then allows to use such relationship and data structure in order to reliably predict or estimate the road surface temperature at other geographic locations, in the vicinity (such as at road segment 11) or remotely (such as in another country).

For instance, with the established relationship between road surface temperature and vehicle sensor data for geographic location 10, the present disclosure allows to collect ambient vehicle sensor data near another geographic location 11 (that does not have a roadside sensor to measure road surface temperature) and determine a road surface temperature estimate using the established relationship, without the need for roadside sensor data.

In the example of FIG. 1, first vehicle 13 will reach the second geographic location 11 before second vehicle 14. As a result, first vehicle 13 may collect current ambient vehicle sensor data near geographic location 11. These data may be used by an apparatus (or a method) according to the present disclosure (not shown in FIG. 1) to generate a road surface temperature estimate, as will be detailed with reference to the Figures in the following.

Figure 2:
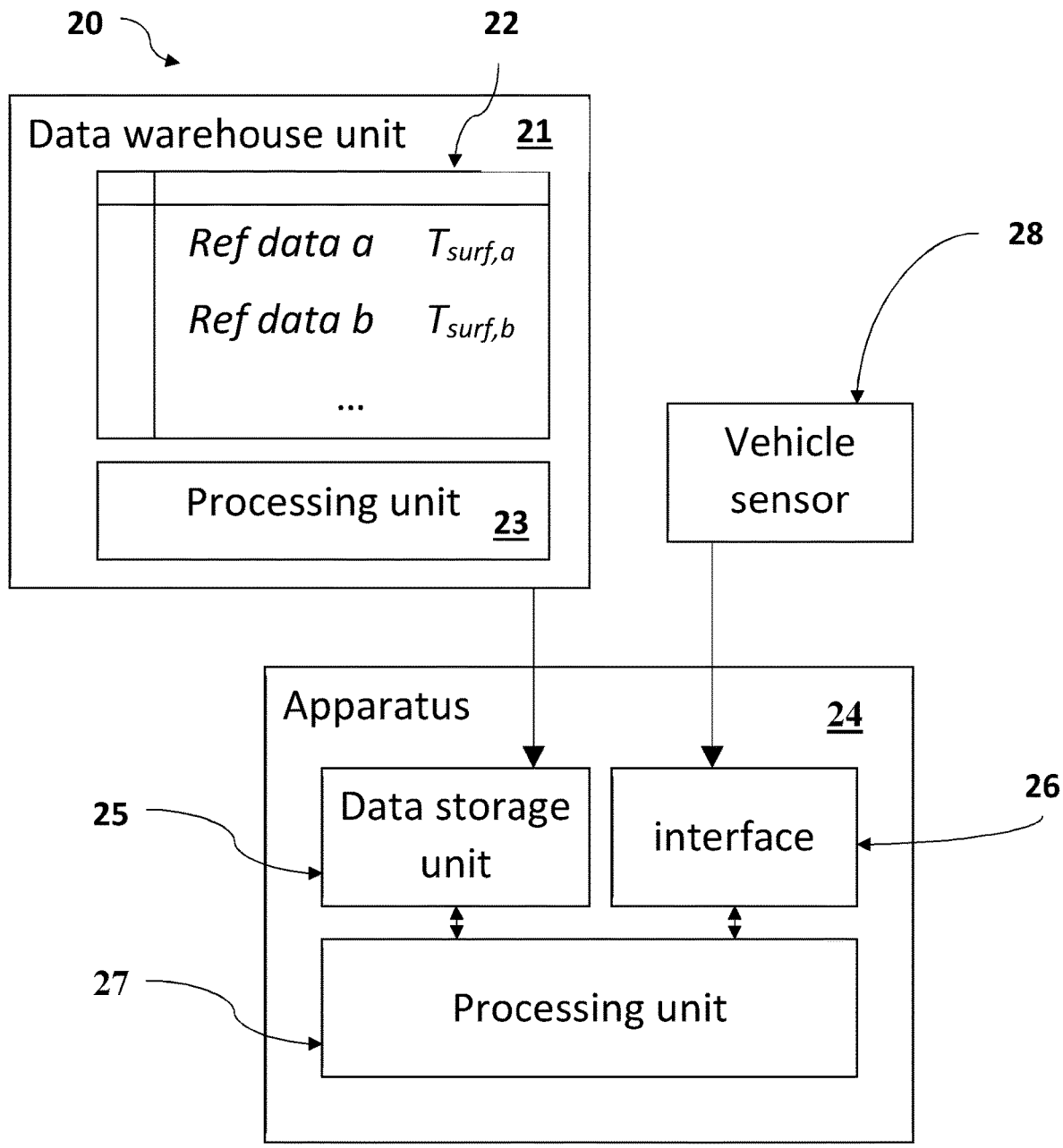
FIG. 2 illustrates a box diagram of a system with an apparatus and a data warehouse unit according to embodiments.

FIG. 2 illustrates a box diagram of a system 20 for estimating road surface temperature for a geographic location. The system 20 has a data warehouse unit 21, an apparatus 24, and a vehicle sensor 28. In other examples, not shown, the system may exclude the vehicle sensor 28.

The data warehouse unit 21 is for producing a data structure. The data warehouse unit 21 comprises a data memory 22 and a processing unit 23.

The data memory 22 is configured to obtain reference ambient sensor data (indicated as "Ref data a", "Ref data b", etc. in FIG. 2) indicative of ambient conditions in vicinity to vehicles, measured by vehicle sensors. The data memory 22 is further configured to obtain reference roadside sensor data indicative of at least road surface temperature (indicated as $T_{surf,a}$, $T_{surf,b}$ etc in FIG. 2) in vicinity to and measured by roadside sensors.

The processing unit 23 is configured to establish a relationship between the reference ambient sensor data and road surface temperature, based on the information in data memory 22. It is further configured to create a data structure encoding the established relationship.

The data warehouse unit 21 is coupled communicatively to the apparatus 24 to transmit the data structure of the data warehouse unit to the apparatus 24, in particular to a data storage unit 25 of the apparatus.

The data warehouse unit 21 is thus to produce a data structure encoding a relationship between ambient data and road surface temperature and to transmit it to the apparatus 24, which is configured to use the relationship encoded in the data structure.

The apparatus 24 is for estimating road surface temperature for a geographical location. The apparatus 24 comprises a data storage unit 25, a communication interface 26 and a processing unit 27.

The data storage unit 25 is configured to store the data structure transmitted by the data warehouse unit 21. As detailed above, the data structure encodes the relationship between reference ambient sensor data, measurable by vehicles, and road surface temperature.

The communication interface 26 is for receiving current vehicle ambient sensor data indicative of current ambient conditions in vicinity to the vehicle. These current vehicle ambient sensor data are measured by one or more vehicle sensors 28, which transmit these data to the communication interface 26.

The processing unit 27 of the apparatus is communicatively coupled with the vehicle sensor 28 via interface 26 and with the data storage unit 25. The processing unit 27 is configured to determine a road surface temperature estimate for the geographical location, using the data structure and based on the collected current vehicle ambient sensor data.

The apparatus 24 is thus for using the relationship encoded in the data structure in order to estimate road surface temperature.

Figure 3:
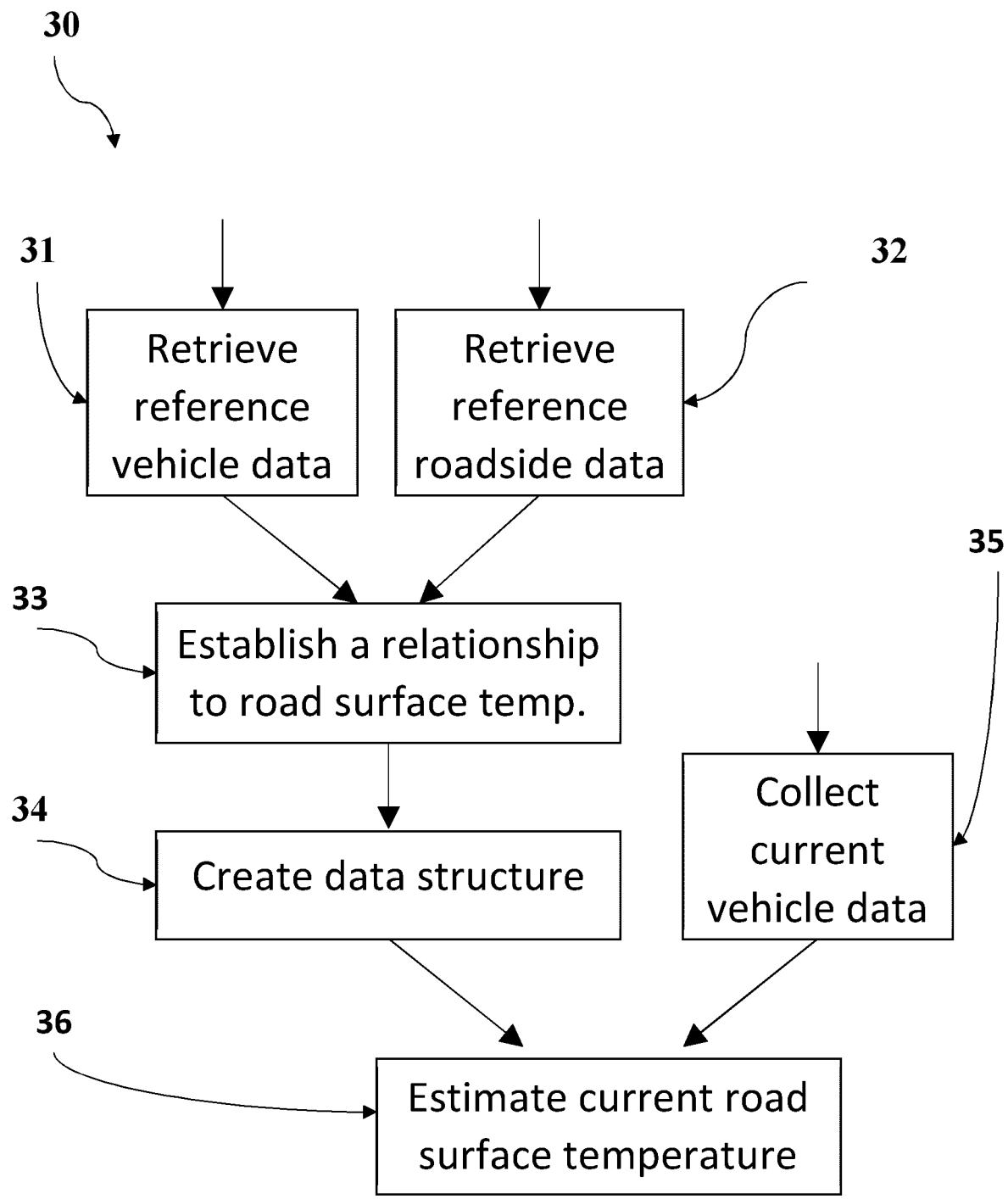
FIG. 3 illustrates a general flow diagram of a method according to embodiments.

FIG. 3 illustrates a general flow diagram of a method 30 for estimating road surface temperature for a geographic location.

The method 30 comprises a step 31 of retrieving reference ambient sensor data and a step 32 of retrieving reference roadside sensor data. The reference ambient sensor data is indicative of ambient conditions in vicinity to mobile vehicles and the reference roadside sensor data is indicative of at least road surface temperature in vicinity to distributed roadside sensors, such as roadside weather stations (e.g. RWIS).

In the example shown, the steps 31 and 32 are performed essentially in parallel. In other examples, these steps may be performed sequentially (first step 31 and then step 32; or first step 32 and then step 31) or only partly in parallel. In still further examples, the step 32 of retrieving reference roadside sensor data (which includes at least road surface temperature in vicinity to distributed roadside sensors) may also include a step (similar to step 31) of retrieving reference ambient sensor data indicative of ambient conditions (such as a time series of ambient air temperature in vicinity to vehicles), as measured by distributed roadside sensors.

Returning to FIG. 3, the method 30 further comprises a step 33 of establishing a relationship between the reference ambient sensor data and road surface temperature, based on the reference ambient sensor data and based on the reference roadside sensor data. It further comprises a step 34 of creating a data structure encoding the established relationship.

The set of steps 31 to 34 may for instance be carried out in a data warehouse and may be considered as a method of producing a relationship data structure.

The method 30 further comprises a step 35 of collecting, at one or more vehicles, current vehicle ambient sensor data indicative of current ambient conditions in vicinity to the one or more vehicles.

Further, the method 30 comprises a step 36 of determining a road surface temperature estimate for the geographic location using the data structure and the collected current vehicle ambient sensor data. In particular, the collected current vehicle ambient sensor data may be used as an input to the data structure. The relationship encoded by the data structure thus allows to obtain as an output a road surface temperature estimate for the geographic location.

As can be seen from FIG. 3, the determining 36 of the road surface temperature estimate excludes the use of current roadside sensor data. Data from distributed roadside stations is only used in steps 32 and 33 for the establishing of the relationship.

The set of steps 35, 36 may for instance be carried out in a network backend and may be considered as a use of a relationship data structure to estimate road surface temperature.

Figure 4:
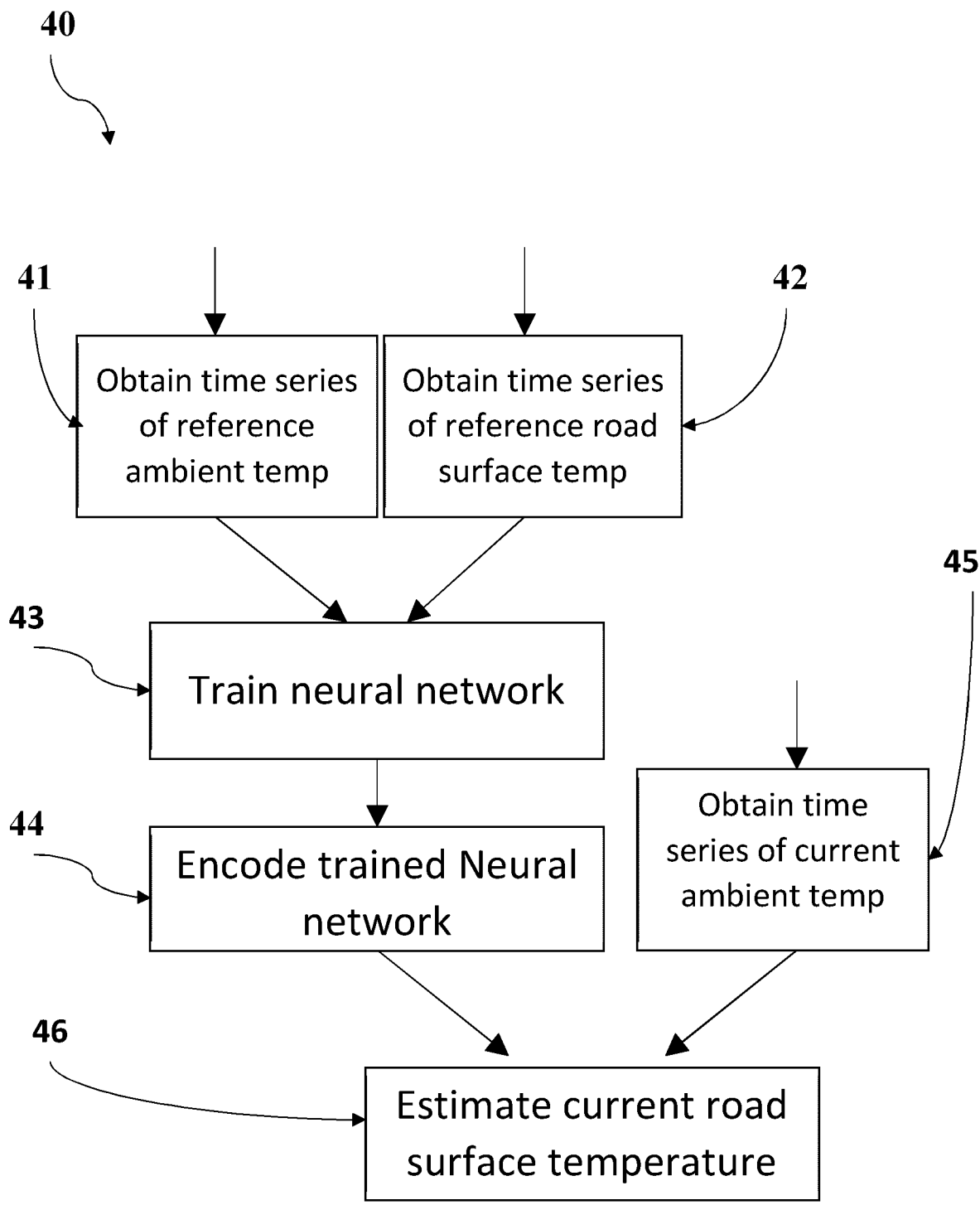
FIG. 4 illustrates a flow diagram of a method according to one particular embodiment.

FIG. 4 illustrates a flow diagram of a particular method 40 for estimating road surface temperature for a geographic location. The method 40 may be considered a preferred embodiment of the more general method 30 shown in FIG. 3.

The method 40 comprises a step 41 of retrieving reference ambient sensor data in form of a time series of reference ambient air temperature. The reference ambient sensor data is thus indicative of the ambient condition of temperature in vicinity to mobile vehicles for a plurality of points in time. In preferred examples, the reference ambient sensor data may include further quantities, such as time series of humidity, air pressure, wind speed, rain intensity, fog, surface water amount, snow amount, ice presence, wind direction, and/or salt amount. However, for illustration purposes, the present example focusses on reference ambient sensor data in the form of a time series of reference ambient air temperature.

The method 40 further comprises a step 42 of retrieving reference roadside sensor data in form of a time series of road surface temperature. The reference roadside sensor data is thus indicative of road surface temperature in vicinity to distributed roadside sensors, such as roadside weather stations (e.g. RWIS).

In the example shown, ambient air temperature is used as an exemplary ambient condition. Additionally, or alternatively other examples of ambient conditions may be used, including sun radiation, GPS location, time, date, humidity, air pressure, wind speed, rain intensity, vehicle speed, fog, surface water amount, snow amount, ice presence, traffic intensity (e.g. vehicles per time), wind direction, salt amount, surface type (such as asphalt, concrete, gravel etc.), estimated friction coefficient.

The method 40 further comprises a step 43 of training a neural network. By training the neural network, a relationship is established between the ambient air temperature (reference ambient sensor data) as measured by the vehicles on the one hand and road surface temperature as measured by the distributed roadside sensors on the other hand.

By virtue of the training of the neural network using ambient air temperature (measured by vehicles) and using the reference road surface temperature, this allows to lay down the dependency of road surface temperature on the measurable input variable of ambient air temperature. In other examples, not shown, further input variables may be used. In any case, the trained neural network may serve to output a road surface temperature estimate upon taking a time series of current vehicle ambient sensor data as input.

In the example shown, the neural network may be trained on the reference ambient sensor data and on the reference roadside sensor data (including road surface temperature) such that the trained neural network may take (current) vehicle ambient sensor data as input to output road surface temperature as output. Such neural network thus encodes the dependency of road surface temperature on ambient sensor data.

In particular for reference data in form of time series, the neural network to be trained may be a recurrent neural network (i.e. which exhibit not only feed-forward links to downstream layers, but also feedback links to the same layer or upstream layers). This allows to include temporal dynamic behavior.

Thus, in the depicted case of training a neural network with a time series of reference ambient sensor data, it may serve to output a road surface temperature estimate upon taking a time series of current vehicle ambient sensor data as input.

Alternatively to training a neural network, other embodiments (not shown) may comprise applying a filtering method.

The method 40 further comprises a step 44 of creating a data structure encoding the trained neural network and a step 45 of collecting current vehicle ambient sensor data in form of a time series of current ambient air temperature.

The time series of current ambient air temperature is indicative of current ambient conditions in vicinity to the one or more vehicles for a plurality of points in time. As each vehicle is moving and remains at a given geographic location only for a limited period of time, the ambient air temperature is preferably measured at multiple vehicles for plurality of points in time, such that the time series is constructed (or estimated) based on data from multiple vehicles for multiple points in time.

Such time series of ambient conditions may be measured also for other examples of current ambient conditions, further including one or more of the following: sun radiation, GPS location, time, date, humidity, air pressure, wind speed, rain intensity, vehicle speed, fog, surface water amount, snow amount, ice presence, traffic intensity (e.g. vehicles per time), wind direction, salt amount, surface type (such as asphalt, concrete, gravel etc.), estimated friction coefficient.

Further, the method 40 comprises a step 46 of determining a road surface temperature estimate for the geographic location, using the trained neural network and using the collected current ambient air temperature data. In particular, the collected current ambient air temperature data may be used as an input to the trained neural network. The relationship encoded by the neural network thus allows to obtain as an output a road surface temperature estimate for the geographic location.

Although not explicitly shown in FIG. 4, the method 40 may further comprise retrieving reference weather data indicative of general weather conditions (e.g. humidity), similar to the retrieving of steps 41, 42. Then, the establishing of the relationship is further based on the reference weather data (in addition to the reference ambient sensor data). Thus, the relationship is established such that it further takes weather data as a (further) input.

In such cases, the method 40 may further comprise receiving current weather data indicative of current general weather conditions for the geographic location, similar to the collecting of step 45. As a result, the step 46 of determining of a road surface temperature estimate would further be based on the current weather data (in addition to the current vehicle ambient sensor data).

Figure 5:
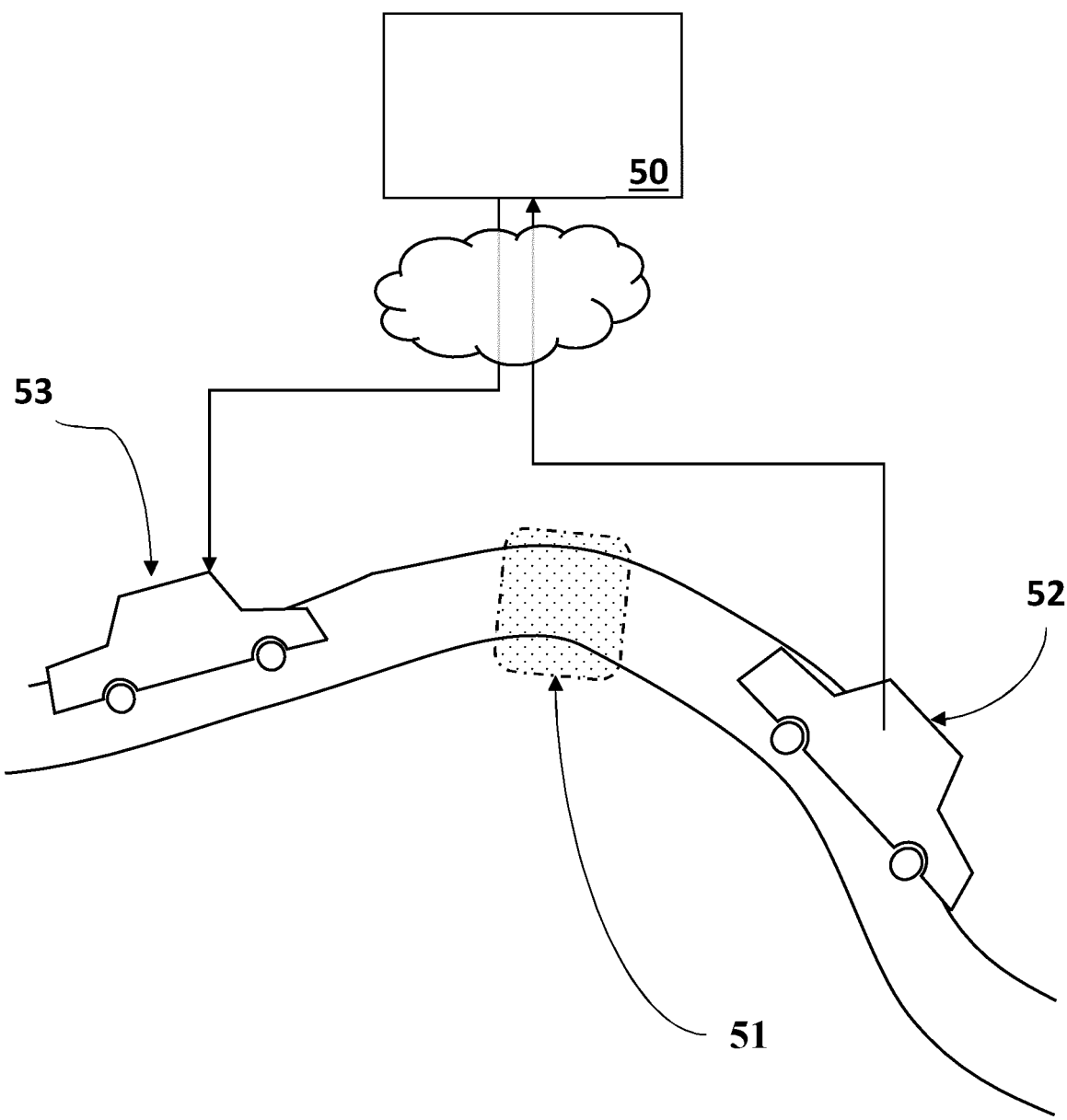
FIG. 5 schematically illustrates a situation with roads and vehicles, in which situation methods, apparatuses or systems according to embodiments may be used.

FIG. 5 schematically illustrates a situation with roads and vehicles, in which situation methods, apparatuses or systems according to the present disclosure may be used.

In particular, FIG. 5 shows an apparatus 50 for estimating road surface temperature for a geographical location. The apparatus 50 stores a data structure (not shown) encoding the relationship between ambient sensor data, measurable by vehicles, and road surface temperature.

A first vehicle 52 has passed a geographic location 51. First vehicle 52 has collected current ambient vehicle sensor data near geographic location 51 and has transmitted these data to apparatus 50.

Although geographic location 51 is not provided with any conventional means to determine road surface temperature, apparatus 50 is configured to estimate road surface temperature using the data structure and based on the transmitted ambient vehicle sensor data of geographic location 51.

In other instances (not shown), the apparatus may base the estimation on a plurality of measurement from a plurality of vehicles, e.g. in form of a time series of ambient vehicle sensor data.

Once the apparatus 50 has estimated road surface temperature, it may generate road condition data (e.g. indicating that the road is icy in case the estimated road surface temperature indicates the presence of ice) and transmit these road condition data (and/or the estimated road surface temperature) to a second vehicle 53 which is currently approaching geographical location 51.

The invention claimed is:

1. A method for estimating current road surface temperature for a geographical location, comprising:
   retrieving, in a data warehouse, reference ambient sensor data indicative of ambient conditions in vicinity to mobile vehicles;
   retrieving, in the data warehouse, reference roadside sensor data that is location-specific and indicative of at least road surface temperature in vicinity to a distributed stationary roadside weather station;
   establishing a relationship between the reference ambient sensor data and road surface temperature, based on the reference ambient sensor data and based on the location-specific reference roadside sensor data;
   creating a data structure encoding the established relationship;
   collecting, at one or more vehicles, current vehicle ambient sensor data indicative of current ambient conditions in vicinity to the one or more vehicles at the geographic location; and
   determining, using the relationship encoded in the data structure and using the collected current vehicle ambient sensor data, a current road surface temperature estimate for the geographic location.

2. The method of claim 1, wherein the method further comprises:
   transmitting the collected current vehicle ambient sensor data from the one or more vehicles to the data warehouse.

3. The method of claim 1, wherein the method further comprises:
   generating road condition data based on the determined road surface temperature estimate; and
   transmitting the generated road condition data to at least one of the vehicles and/or to other vehicles.

4. The method of claim 1, wherein
   the retrieved reference ambient sensor data comprises a first time series indicative of ambient conditions for a first plurality of points in time,
   the collected current vehicle ambient sensor data comprises a second time series indicative of current ambient conditions for a second plurality of points in time.

5. The method of claim 1, wherein establishing the relationship includes:
   (a) training a neural network and wherein the data structure is representative of the neural network, or
   (b) applying a filtering method, in particular a Kalman filter or a Bayesian filter or a non-statistical filter, and wherein the data structure is representative of an output of the filtering method.

6. The method of claim 1, wherein any or all of the following is location-specific: said reference ambient sensor data; said current vehicle ambient sensor data.

7. The method of claim 1, wherein determining the road surface temperature estimate excludes use of current roadside sensor data.

8. The method of claim 1, wherein the reference ambient sensor data and/or the vehicle ambient sensor data and/or the reference roadside sensor data are indicative of one or more of the following:
   ambient air temperature, sun radiation, GPS location, time, date, humidity, air pressure, wind speed, rain intensity, vehicle speed, fog, surface water amount, snow amount, ice presence, traffic intensity, wind direction, salt amount, surface type, or estimated friction coefficient.

9. The method of claim 1, wherein the method further comprises:
   retrieving, in the data warehouse, reference weather data indicative of general weather conditions; and
   receiving current weather data indicative of current general weather conditions for the geographic location; and wherein
   establishing the relationship is further based on the reference weather data, and
   determining the road surface temperature estimate is further based on the current weather data.

10. A system for estimating road surface temperature for a geographical location, comprising:
    a data storage unit, configured to store a data structure encoding a relationship between reference ambient sensor data, measurable by vehicles, and road surface temperature measured by a distributed stationary roadside weather station;
    a communication interface for receiving current vehicle ambient sensor data indicative of current ambient conditions in vicinity to a vehicle; and
    a processing unit, the processing unit being communicatively coupled with a vehicle sensor and the data storage unit and configured to determine, using the relationship encoded in the data structure, a road surface temperature estimate for the geographical location based on the collected current vehicle ambient sensor data.

11. The system of claim 10, further comprising:
    a data warehouse unit configured to:
    obtain reference ambient sensor data indicative of ambient conditions in vicinity to vehicles,
    obtain, reference roadside sensor data that is location-specific and indicative of at least road surface temperature in vicinity to and measured by roadside sensors,
    establish, in the data warehouse, a relationship between the reference ambient sensor data and road surface temperature, based on the reference ambient sensor data and based on the location-specific reference roadside sensor data,
    create the data structure encoding the established relationship; and wherein the data warehouse unit is coupled communicatively to the apparatus to transmit the data structure of the data warehouse unit to an apparatus of the processing unit.

12. The system of claim 11, further comprising:
a vehicle sensor, configured to collect current vehicle ambient sensor data indicative of current ambient conditions in vicinity to the vehicle, wherein the vehicle sensor is communicatively coupled to the communication interface of the apparatus.

13. A data warehouse unit for producing data structures, the data warehouse configured to:
obtain reference ambient sensor data indicative of ambient conditions in vicinity to vehicles,
obtain, reference roadside sensor data that is location-specific and indicative of at least road surface temperature in vicinity to and measured by a distributed stationary roadside weather station,
establish, in the data warehouse, a relationship between the reference ambient sensor data and road surface temperature, based on the reference ambient sensor data and based on the location-specific reference roadside sensor data,
create a data structure encoding the established relationship; and
transmit the data structure to an apparatus.

* * * * *